(12) United States Patent
Muschiol

(10) Patent No.: US 9,242,434 B2
(45) Date of Patent: Jan. 26, 2016

(54) DEVICE AND METHOD FOR PRODUCING LAMINATED SAFETY GLASS

(75) Inventor: Michael Muschiol, Marl (DE)

(73) Assignee: FOTOVERBUNDGLAS MARL GMBH, Marl (DE)

( * ) Notice: Subject to any disclaimer, the term of this patent is extended or adjusted under 35 U.S.C. 154(b) by 703 days.

(21) Appl. No.: 13/500,680

(22) PCT Filed: Sep. 14, 2010

(86) PCT No.: PCT/EP2010/063470
§ 371 (c)(1),
(2), (4) Date: Apr. 23, 2012

(87) PCT Pub. No.: WO2011/042285
PCT Pub. Date: Apr. 14, 2011

(65) Prior Publication Data
US 2012/0318438 A1  Dec. 20, 2012

(30) Foreign Application Priority Data

Oct. 9, 2009  (DE) .......................... 10 2009 048 999

(51) Int. Cl.
*B32B 17/10* (2006.01)
*B30B 5/02* (2006.01)
(Continued)

(52) U.S. Cl.
CPC ............. *B32B 17/10871* (2013.01); *B30B 5/02* (2013.01); *B32B 17/10036* (2013.01); *B32B 17/10761* (2013.01); *B32B 37/1009* (2013.01);
(Continued)

(58) Field of Classification Search
CPC  B30B 5/02; B32B 37/1009; B32B 17/10036; B32B 17/10761; B32B 17/10871; B32B 2315/08; B32B 2329/06
See application file for complete search history.

(56) References Cited

U.S. PATENT DOCUMENTS 3,938,361 A * 2/1976 Claesson et al. ................... 72/63
5,108,532 A * 4/1992 Thein et al. ................... 156/285
(Continued)

FOREIGN PATENT DOCUMENTS

| CN | 1406743 A | 4/2003 |
|---|---|---|
| DE | 100 48 974 A1 | 4/2002 |

(Continued)

OTHER PUBLICATIONS

Definition of annular from thefreedictionary.com. Retrieved online Jun. 30, 2015. http://ww.thefreedictionary.com/annular.*

*Primary Examiner* — Christopher Schatz
(74) *Attorney, Agent, or Firm* — Hudak, Shunk & Farine Co. LPA

(57) ABSTRACT

A device and a method for producing laminated safety glass from at least two glass panes having an adhesive layer arranged in between. In order to provide a device and a method for producing laminated safety glass that allow for the cost-effective production of laminated safety glass, the device includes a base plate and a cover plate that can be adjusted relative to each other between an operating position and a removal position, a sealing frame disposed in a pressure tight manner in the operating position on the base plate and the cover plate, means for creating a vacuum in a hollow space formed between a cladding material covering the glass panes in the operating position and the base plate, means for creating an overpressure in the working space created between the cover plate and the flexible cladding material arranged on the glass panes in the operating position, and heating means for heating the glass panes to be joined.

19 Claims, 2 Drawing Sheets

(51) Int. Cl.
  *B32B 37/10* (2006.01)
  *B32B 39/00* (2006.01)
  *B32B 37/00* (2006.01)
  *B32B 38/16* (2006.01)

(52) U.S. Cl.
  CPC .............. *B32B 39/00* (2013.01); *B32B 37/003* (2013.01); *B32B 2038/166* (2013.01); *B32B 2310/0409* (2013.01); *B32B 2315/08* (2013.01); *B32B 2329/06* (2013.01)

(56) References Cited

U.S. PATENT DOCUMENTS

| | | | |
|---|---|---|---|
| 5,156,795 A | * | 10/1992 | Harvey et al. ................. 264/510 |
| 5,591,369 A | * | 1/1997 | Matsen et al. ................. 219/633 |
| 6,250,217 B1 | * | 6/2001 | Korybutiak ................... 100/326 |
| 6,779,703 B2 | | 8/2004 | Matsumoto et al. |
| 2007/0215287 A1 | | 9/2007 | Stevens |

FOREIGN PATENT DOCUMENTS

| | | |
|---|---|---|
| DE | 10218198 C1 | 12/2003 |
| DE | 102004034175 B3 | 9/2005 |
| DE | 10 2004 030 658 A1 | 1/2006 |
| DE | 20 2008 008 799 U1 | 10/2008 |
| DE | 10 2008 030 927 A1 | 10/2009 |
| EP | 1609597 A2 | 12/2005 |
| EP | 2 159 047 A1 | 3/2010 |
| EP | 2189283 A1 | 5/2010 |
| EP | 2 236 287 A2 | 6/2010 |
| WO | 2006 128699 A2 | 12/2006 |

* cited by examiner

DEVICE AND METHOD FOR PRODUCING LAMINATED SAFETY GLASS

FIELD OF THE INVENTION

The invention relates to a device and a method for producing laminated safety glass from at least two glass panes and an adhesive layer disposed in between the glass panes.

BACKGROUND OF THE INVENTION

Laminated safety glass of the initially named type generally comprises two glass panes and an adhesive layer connecting the glass panes that is preferably formed by a film of polyvinyl butyral (PVB). Glass panes of this type are used in the motor vehicle sector or construction sector, for instance.

Such laminated safety glass, with the properties necessary for this purpose, is typically produced in autoclaves in which the glass panes, combined into a pre-laminate with the adhesive film disposed in between, are pressed at temperatures of up to 145° C. and pressures of more than 10 bar, forming the actual laminated safety glass. The use of autoclaves has the disadvantage that they, as well as the actual production process, are particularly costly and time-consuming, and therefore are not economically viable, particularly for small production quantities.

SUMMARY OF THE INVENTION

The object of the invention is to provide a device and a method for producing laminated safety glass that allows laminated safety glass to be produced cost-effectively.

This object is solved by a device for producing laminated safety glass from at least two glass panes with an adhesive layer disposed in between, comprising a base plate and a cover plate, which can be adjusted relative to each other between an operating position and a removal position, a sealing frame disposed in the operating position on the base plate and the cover plate in a pressure tight manner, a vacuum unit for creating a vacuum in a hollow space formed between a cladding material covering the glass panes in the operating position and the base plate, a pressure unit for creating an overpressure in a working space formed in the operating position between the cover plate and the flexible cladding material disposed on the glass panes, and heating unit for heating the glass panes to be connected, wherein the base plate and the cover plate are disposed in the operating position within a frame formed by at least two annular carriers, and a method for producing laminated safety glass from at least two glass panes and an adhesive layer disposed between the glass panes, in particular using the device, and comprising the steps of disposing the glass panes with the adhesive layer disposed in between on a based plate, covering the glass panes with the flexible cladding material and creating a vacuum in a hollow space between the cladding material and the base plate, creating a sealed working space between the cover plate and the cladding material disposed on the glass panes, creating an overpressure in the working space, and heating the glass panes with the adhesive layer, and subsequently cooling. Advantageous further developments of the invention are specified in the dependent claims.

According to the invention, the device for producing laminated safety glass has a base plate and a cover plate that can be adjusted relative to each other between an operating position and a removal position. In the removal position, in which the base plate is freely accessible from at least one side, and preferably from three sides, it is possible for the operator of the device to easily position on the base plate a pre-laminate that is formed from two glass panes and one adhesive layer, preferably a PVB film, disposed in between the glass panes. At the same time, the removal position also makes it possible for the operator, after completion of the production process, to remove the laminated safety glass produced in the device from the device in a substantially unobstructed manner.

In the operating position of the device, the base plate with the cover plate, in conjunction with a sealing frame disposed between the plates in a pressure-tight manner, and creating a distance between the plates, form an airtight, or respectively pressure tight, working space. The base plate and the cover plate can be moved, particularly towards each other, for adjusting the device between the removal position and the operating position.

The device according to the invention has further means for creating a vacuum and means for creating an overpressure, both in the operating position. Using the means for producing a vacuum, a vacuum is created in a hollow space formed between the base plate and a flexible cladding material covering the pre-laminate. The means for creating the overpressure are used according to the invention for producing an air pressure that is greater than the atmospheric pressure in the working space between the cover plate and the cladding material disposed on the glass panes. Due to the flexible design of the cladding material and supported by the vacuum in the hollow space, the overpressure in the working space acts uniformly on the pre-laminate and presses the glass panes together.

For producing the laminated safety glass, in addition to pressing the glass panes together, it is necessary to adjust a process temperature depending on the adhesive layer used. In the operating position, heating means are used for heating the pre-laminate to the required temperature before, during and/or after creating the vacuum in the hollow space and the overpressure in the working space, and for maintaining this temperature for a specified period.

The device according to the invention is characterized by the simple design thereof, and by simple adjustment of efficient basic conditions for cost-effective production due to the flexible cladding material and the possibility to use sealing frames with variable dimensions adapted to the size of the pre-laminate.

The interaction of the vacuum in the hollow space with the overpressure in the working space, which acts on the pre-laminate due to the flexible design of the cladding material, guarantees in a particular reliable way that existing air bubbles or moisture which can precipitate between the glass panes, in particular due to the absorption properties of PVB film, are removed particularly reliably from the region between the glass panes. Furthermore, in contrast to mechanically applied pressure, the overpressure in the working space guarantees that the glass panes are pressed together in particularly uniform manner. The device according to the invention particularly guarantees the reliable and cost-effective production of laminated safety glass.

For additional cost reductions for producing the laminated safety glass, a silicone rubber mat is advantageously used as the cladding material that can be inserted separately into the device, or can also be stored, or respectively disposed, for example on a storage roll at the device. This silicone rubber mat can be reused multiple times and can be placed over the pre-laminate in a particularly simple manner. Furthermore it guarantees a sealed hollow space that can be evacuated for creating a vacuum, particularly in the case of an enclosing pressure on the base plate by means of the sealing frame. For this purpose, the silicone rubber mat preferably has a connector formed on it for a suction line.

The sealing frame provided according to the invention primarily performs the function of creating an airtight working space in the region between the plates. In the case of the previously described design using a silicone rubber mat as a cladding material, the sealing frame can additionally be used for the purpose of pressing the silicone rubber mat onto the cover plate in an enclosing manner in order to also form a particularly reliable airtight hollow space between the cladding material and the base plate. In the process, the cladding material also serves as a sealing element, sealing the working space with respect to the environment.

In principle, the sealing frame can have any design, as long as it does not exceed the dimensions of the base plate and cover plate. Therefore, it is possible to use different sealing frames depending on the size of the laminated safety glasses to be produced, wherein the sealing frames are simply placed into the device on a case-by-case basis. Alternatively, a one-piece design of the base plate or cover plate with the sealing frame is possible, wherein then the sealing frame projects from one of the plates, preferably the cover plate, in the manner of an enclosing web. However, according to one particularly advantageous design of the invention, the sealing frame is releasably connected to the base plate or cover plate. The releasable connectivity combines the advantages of a one-piece sealing frame connected to the base plate or cover plate with the advantages of using sealing frames of the varying sizes. Furthermore, the releasable connectivity guarantees that the frame being used is disposed and held in a positionally accurate manner. The use of sealing frames adapted in size to the laminated safety glass to be produced makes it possible to form such hollow spaces, or respectively working spaces, in which the necessary process conditions, such as pressure and temperature, can be produced particularly quickly.

According to the invention, the device has means for producing a vacuum in the hollow space and an overpressure in the working space. In the case of the advantageous use of a silicone rubber mat as a cladding material, at least one line connected in a pressure tight manner to this silicone rubber mat forms such a means, where the other end of the line can be connected to an advantageously provided vacuum unit for generating the vacuum. Means for creating an overpressure can be formed by pressure lines, for example, reaching into the working space.

In principle, the connection lines can be guided out of the device in any manner, wherein it is conceivable to dispose connectors on the outside of the cover plate and/or base plate, for example. However, according to a particularly advantageous design of the invention, the sealing frame has line feed-throughs for connecting lines of a vacuum unit and/or pressure unit. According to this embodiment of the invention, connectors which lead within the device into the working space and/or hollow space, are disposed on the outside on the sealing frame in the operating position. The arrangement of the line feed-throughs in the sealing frame is particularly characterized in that in the operating position these feed-throughs are easily accessible from the outside, so therefore it is possible to easily allow connection of the preferably provided vacuum units and/or pressure units. It is also conceivable to combine the vacuum unit and/or pressure unit into one pumping unit which can be switched in a known manner depending on the operating state to be set.

The formation of a working space in the region between the cover plate and the base plate that is pressure tight for the duration of the process, is essential for the function of the device according to the invention. In principle, a reliable arrangement can be attained already using suitable means for adjusting the base plate relative to the cover plate, wherein securing the position of the base plate with respect to the cover plate can be realized by the selected adjustment means. However, according to an advantageous further development of the invention, it is provided that the base plate and the cover plate can be locked in the operating position. The lockability, for instance a mechanical lock with appropriate locking elements, guarantees in a particularly reliable manner that the base plate and the cover plate are secured relative to each other in the operating position. The design of the lock is basically freely selectable, wherein along with mechanical locking means, hydraulic or electrical locking means can also be used.

Likewise, the design of the heating means provided according to the invention for heating the glass panes to be connected is basically freely selectable. Electrical heating lines running, for example, in a meandering manner in the cover plate and/or base plate, and which heat one or both plates, are conceivable. According to an advantageous further development of the invention, however, the heating unit is formed by pipelines running in the base plate and/or cover plate. The pipelines serve for receiving, or respectively conducting, a liquid heating medium such as water that is conducted through the pipelines. The use of pipelines is characterized in that the heat transfer can be varied using the flow speed of the fluid medium to be conducted. For rapid heat transfer, for example the water quantity is kept exceedingly low in order to attain high flow speeds. Furthermore, the pipelines in the cover plate and/or base plate can be used further for accelerating, or respectively controlling, cooling after the production process, wherein then, the hot fluid medium is replaced by a cold medium, for instance water. Reducing the cooling phase increases cost-effectiveness of the device in a supplementary manner.

For increasing efficiency it is particularly advantageous that both the base plate as well as the cover plate are provided with the advantageously provided pipelines. Thermal insulation is advantageously provided, preferably disposed on the outside of the base plate and/or cover plate, and similarly serves for increasing efficiency. Furthermore, because the insulation effectively prevents components of the device that are accessible to the operator from heating up, the thermal insulation serves for increasing the safety during the operation of the device.

The relative adjustability of the base plate with respect to the cover plate can be designed in any manner. It is particularly advantageous however, if the base plate can be slid longitudinally and can be adjusted in direction towards the cover plate. This design of the invention, due to the longitudinal adjustability, wherein the base plate can be extracted from the device, for example on rails, allows simple accessibility of the base plate and with it simple arrangement and removal of the pre-laminate and the produced laminated safety glass after the conclusion of the process. After the arrangement of the pre-laminate, the base plate can be slid into the device, for example like a type of drawer, where the base plate is then adjusted in direction towards the cover plate in order to form the closed working space.

The means for creating the adjustability of the base plate in direction towards the cover plate can be designed to be both a mechanical as well as hydraulic means. However, it is particularly advantageous if the means are formed by pneumatic bellows cylinders by means of which the base plate can be adjusted in direction toward the cover plate. The use of pneumatic bellows cylinders is characterized in that these adjust the base plate particularly uniformly in direction toward the cover plate, guaranteeing with particularly high reliability the formation of a work space that is sealed with respect to the environment. Furthermore the use of the pneumatic bellows cylinders enables a simple expandability, or respectively adjustability, of the device according to customer specification. For expanding the system in order to adapt to different plate sizes it is only necessary to increase the number of bellows cylinders, wherein it is possible in a simple manner to adapt, or respectively produce, the device in any length and width.

Likewise the design, according to an advantageous further development, is particularly advantageous for the possibility to expand, or produce, the device according to the invention in any dimension; according to this design, the base plate and cover plate in the operating position are disposed within a frame formed by at least two carriers. The length of the device can be set in any manner using the number of carriers that are disposed after each other building an interior space for receiving the cover plate and base plate. Furthermore, the carriers have that advantage that all process forces are absorbed by the carriers due to the positioning in the operating position of the cover plate and the base plate within the surrounding carriers. The device, for its part, can be set up at the production site on supports disposed on the carriers merely depending on the weight of the device. It is particularly advantageous if the carrier has a T-shaped cross section. In the case of using the carriers in conjunction with the pneumatic bellows cylinders, these are also disposed within the interior formed by the carriers, whereby it is guaranteed in a supplementary manner that no pressure forces are conducted toward the outside.

In the case of using the annular carriers in conjunction with the pneumatic bellows cylinders, these are also disposed within the interior formed by the annular carriers, whereby it is guaranteed in a supplementary manner that no pressure forces are conducted toward the outside.

Both the use of the T-shaped carriers and the use of the pneumatic bellows cylinders therefore permit a type of modular design for the production of the device according to the invention, in basically freely selectable dimensions. Therefore, the device can be produced particularly cost-effectively corresponding to the respective customer wishes.

The method according to the invention for producing laminated safety glass that is performed using the device according to the invention, has the following steps:
disposing the glass panes with the adhesive layer disposed in between on a base plate, wherein preferably a PVB film is used as an adhesive layer,
covering the glass panes with a flexible cladding material, preferably a silicone rubber mat, and
creating a vacuum in a hollow space between the cladding material and the base plate,
producing a sealed working space between the cover plate and the cladding material disposed on the glass panes,
creating an overpressure in the working space, and
heating the glass panes with adhesive layer and subsequently cooling.

The method according to the invention is particularly characterized in that laminated safety glass can be produced particularly efficiently and in a reliable manner with low cost. After producing a sealed working space between the cover plate and the cladding material disposed on the glass panes, the processes for producing a vacuum in a hollow space between the cladding material and the base plate, creating an overpressure in the working space, and heating the pre-laminate, can occur in steps or simultaneously. However, it is particularly advantageous that the heating process begins after creating a vacuum in the hollow space preferably of −1.0−−0.5 bar, particularly preferably of −0.95 bar, and at the end of the heating process, the working space is pressurized to a pressure of 1.5-4 bar, preferably 2-3 bar, particularly preferably 1.4-1.8 bar. The temperature to be set is determined by the adhesive layer used, wherein in the case of the preferred use of PVB films, a temperature is set to 125-155° C., preferably 130-140° C., particularly preferably 135° C.

BRIEF DESCRIPTION OF THE DRAWINGS

In the following, example embodiments of the invention are described in more detail with reference to the drawings. They drawings show.

DETAILED DESCRIPTION OF THE INVENTION

Figure 1:
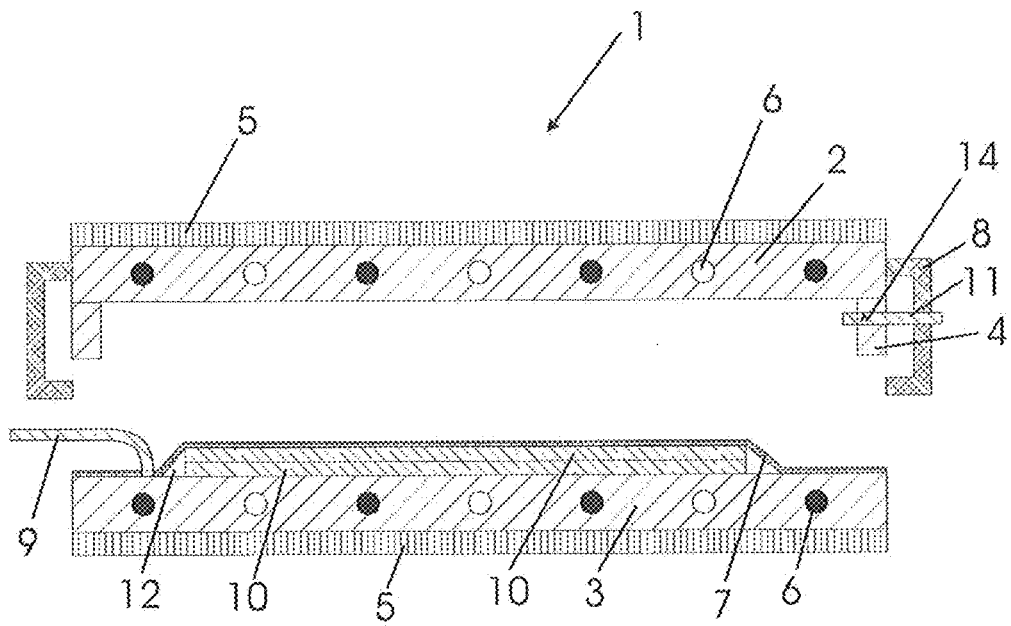
FIG. 1 a view of a section of a first embodiment of a device for producing laminated safety glass in a removal position.

FIG. 1 shows a view of a section through a device 1 for producing laminated safety glass, wherein the sectional plane runs vertically in the use position of the device 1.

The device 1 has a base plate 3 and a cover plate 2 that can be adjusted relative to it. The base plate 3 serves for receiving a pre-laminate comprised of two glass panes 10 and an adhesive layer disposed in between, preferably a PVB film, not shown here, that is laminated within the device 1 into a laminated safety glass. In a removal position shown in FIG. 1, after arranging the pre-laminate on the base plate 3, a cladding material formed as a silicone rubber mat 7 is spread out flat over the pre-laminate such that a hollow space 12 results between the silicone rubber mat 7 and the base plate 3.

Figure 2:
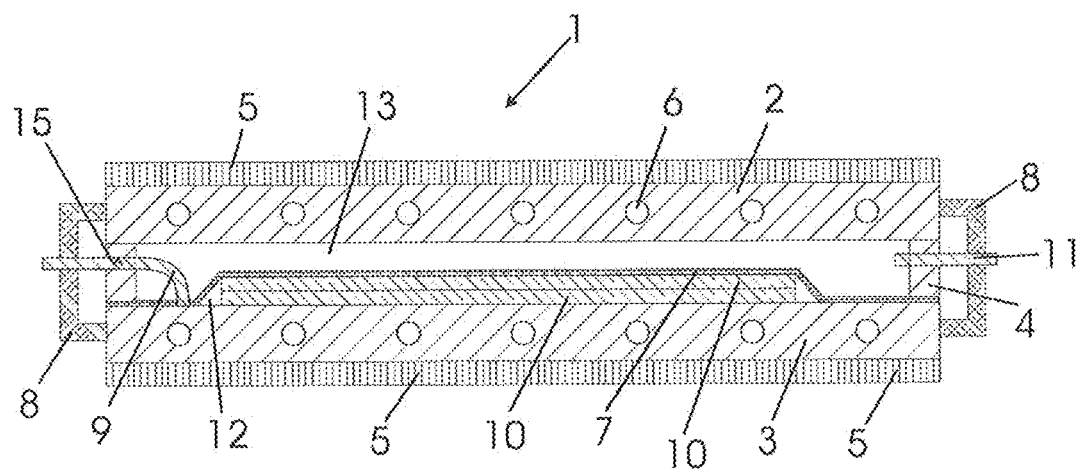
FIG. 2 a view of a section of the device from FIG. 1 in an operating position, and
FIG. 3 a perspective view of a second embodiment of a device for producing laminated safety glass in an operating position.

In the operating position shown in FIG. 2, the base plate 3 is adjusted with respect to the cover plate 2 such that a sealing frame 4, disposed enclosing on the cover plate 2, abuts on the base plate 3 with an interposed edge of the silicone rubber mat 7. The sealing frame 4 in conjunction with the silicone rubber mat 7 guarantees that both the hollow space 12 and also a working space 13 formed in the operating position between the cover plate 2 and the base plate 3, are sealed closed in an air tight, or respectively pressure tight manner.

In the operating position, pipelines 9, 11 serve for creating a vacuum in the hollow space 12, or respectively creating an overpressure in the working space 13. For the purpose of creating the vacuum the pipeline 9 is connected to the silicone rubber mat 7 such that the hollow space 12 can be evacuated via this pipeline. For connecting a vacuum unit, not shown here, the pipeline 9 is guided out of the device 1 through a line feed-through 15 disposed in the sealing frame 4, so that the vacuum unit can be connected to the pipeline 9 in a simple manner, for example using quick connects.

In addition, the sealing frame 4 has a line feed-through 14 for a line 11 which is formed for connecting to a pressure unit, also not shown, such as a compressor, by means of which the working space 13 can be pressurized, wherein it is particularly advantageously provided to adjust the pressure in the working space so that the absolute pressure acting on the prelaminate is 2.4 bar. The vacuum in the hollow space 12 preferably amounts to −0.95 bar.

To safeguard the production process, the position of the cover plate 2 with respect to the base plate 3 is secured in the operating position by locking means 8. The process temperature to be set represents an essential process parameter along with creating the vacuum in the hollow space 12, or respectively the overpressure in the working space 13. Pipelines 6 that are disposed in a meandering manner in the base plate 3 and the cover plate 2, serve for heating the pre-laminate. These pipelines 6 serve for conveying a liquid medium, preferably water, which in the heating phase has a temperature corresponding to the process temperature, and after the heating phase can be replaced by cold water so that the cooling process can be accelerated.

Thermal insulation formed as thermal insulation plates 5 that are disposed on the outside of the base plate 3 and the cover plate 2 serve to further optimize the process, and with that contribute to an increase in efficiency. Furthermore, the insulation plates 5 serve the purpose of protecting parts of the device 1 that can be accessed from the outside, from excess heating, which during operation would require special diligence.

Figure 3:
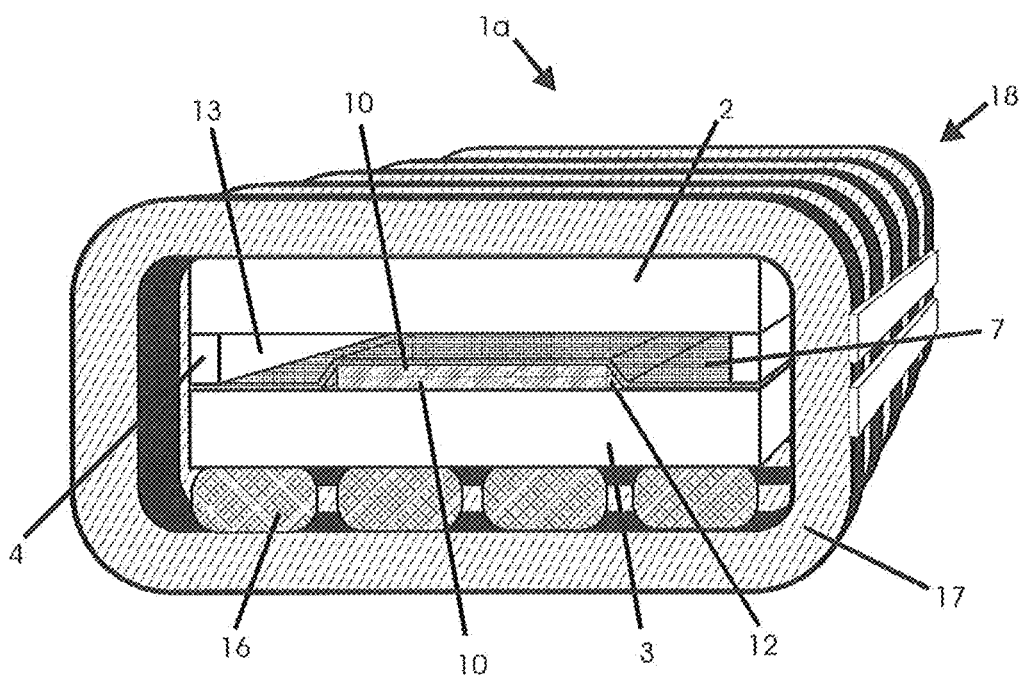

FIG. 3 shows a second embodiment of a device 1a for producing laminated safety glass. The embodiment represented in FIG. 3 differs from the embodiment represented in FIGS. 1 and 2 in that the base plate 3 can be adjusted in direction toward the cover plate 2 using pneumatic bellows cylinders 16. The pneumatic bellows cylinders 16 are characterized here in that they guarantee a particularly uniform pressure of the base plate 3 at the sealing frame 4 of the cover plate 2. Furthermore, the pneumatic bellows cylinders 16, in conjunction with the carriers 17 that are disposed in the longitudinal direction of the plates 2, plates 2,3, enable a flexible configuration of the device 1a. The frame 18 formed by the carriers 17 can be arbitrarily expanded by the number thereof, so that a device 1a can be produced in basically any length corresponding to the customers wishes, wherein for this purpose it is only necessary to increase of the number of pneumatic bellows cylinders 16 and to use correspondingly larger plates 2, 3.

Furthermore, the frame 18 formed by the carriers 17 has the advantage that no loads arise on the outside of the frame 18 as a consequence of the contact pressure of the bellows cylinders 16. For arranging the device 1a in a production hall for example, is merely necessary to fasten the frame 18 to a support provided for this purpose.

By the way the design of the device 1a is the same as the design corresponding to the device 1 in the FIGS. 1 and 2, wherein in the device 1a the representation of line feed-throughs and codling lines, or respectively heating lines, were omitted for the sake of clarity. For adjusting the base plate 3 in a removal position, furthermore it can be withdrawn from the frame 18 on rails, not represented here, so that simple accessibility is guaranteed.

The device according to the invention, or respectively the method according to the invention, can also be used in order to reliably implement difficult laminated procedures. Thus, there exists the possibility for example to use films with a lattice structure or printed films for reliably producing laminated safety glass.

What is claimed is:

1. A device for producing laminated safety glass from at least two glass panes with an adhesive layer disposed in between, comprising:
    a base plate and a cover plate, which can be adjusted relative to each other between an operating position and a removal position,
    a sealing frame disposed in the operating position on the base plate and the cover plate in a pressure tight manner,
    a vacuum unit for creating a vacuum in a hollow space formed between a cladding material covering the glass panes in the operating position and the base plate,
    a pressure unit for creating an overpressure in a working space formed in the operating position between the cover plate and the flexible cladding material disposed on the glass panes, and
    heating unit for heating the glass panes to be connected,
    wherein the base plate and the cover plate are disposed in the operating position within a frame formed by at least two carriers, each with a hollow rounded rectangular shape, wherein the at least two carriers are disposed one after another, building an interior space for receiving both the cover plate and base plate and wherein the length of the device can be set in any manner using a desired number of carriers that are disposed after each other building the interior space for receiving the cover plate and base plate.

2. The device according to claim 1, wherein the sealing frame is detachably connected to the base plate or the cover plate.

3. The device according to claim 1, wherein the sealing frame is formed by an enclosing web projecting from the cover plate.

4. The device according to claim 1, wherein the sealing frame has line feed-throughs or connecting pipelines of the vacuum unit and/or pressure unit.

5. The device according to claim 1, wherein the base plate and the cover plate can be locked in the operating position.

6. The device according to claim 1, wherein the heating unit is formed by pipelines running in the base plate and/or the cover plate.

7. The device according to claim 1, wherein the base plate and the cover plate can be moved, particularly towards each other, for adjusting the device between the removal position and the operation position.

8. The device according to claim 1, wherein the annular carriers have a T-shaped cross-section.

9. The device according to claim 1, wherein the sealing frame is formed by an enclosing web projecting from the cover plate, and wherein the sealing frame has line feed-throughs for connecting pipelines of the vacuum unit and/or pressure unit.

10. The device according to claim 9, wherein the base plate and the cover plate can be locked in the operating position, and wherein the heating unit is formed by pipelines running in the base plate and/or the cover plate.

11. The device according to claim 10, wherein a thermal insulation is disposed on an outside of the base plate and/or the cover plate, and wherein the base plate can be slid longitudinally, and can be adjusted in a direction towards the cover plate.

12. The device according to claim 11, wherein the base plate can be adjusted in a direction toward the cover plate by means of pneumatic bellows cylinders, and wherein the annular carriers have a T-shaped cross-section.

13. The device according to claim 1, wherein the base plate and the cover plate can be locked in the operating position, and wherein the heating unit is formed by pipelines running in the base plate and/or the cover plate.

14. The device according to claim 13, wherein the base plate can be slid longitudinally, and can be adjusted in a direction towards the cover plate.

15. The device according to claim 14, wherein the base plate can be adjusted in a direction toward the cover plate by means of pneumatic bellows cylinders, and wherein the annular carriers have a T-shaped cross-section.

16. The device according to claim 7, wherein the base plate can be adjusted in a direction toward the cover plate by means of pneumatic bellows cylinders.

17. A device for producing laminated safety glass from at least two glass panes with an adhesive layer disposed in between, comprising:
- a base plate and a cover plate, which can be adjusted relative to each other between an operating position and a removal position,
- a sealing frame disposed in the operating position on the base plate and the cover plate in a pressure tight manner,
- a vacuum unit for creating a vacuum in a hollow space formed between a cladding material covering the glass panes in the operating position and the base plate,
- a pressure unit for creating an overpressure in a working space formed in the operating position between the cover plate and the flexible cladding material disposed on the glass panes, and
- heating unit for heating the glass panes to be connected,
- wherein the base plate and the cover plate are disposed in the operating position within a frame formed by at least two rectangular carriers that are disposed side by side, one after each other, and each carrier including an interior space for receiving both the cover plate and base plate, wherein each of the at least two carriers are continuous and completely surround a portion of both the cover plate and the base plate, and wherein the length of the device can be set in any manner using a desired number of carriers that are disposed after each other.

18. The device according to claim 1, wherein a thermal insulation is disposed on an outside of the base plate and/or the cover plate.

19. The device according to claim 7, wherein the base plate can be slid longitudinally, and can be adjusted in a direction towards the cover plate.

* * * * *